Sept. 11, 1945.   F. J. RODE   2,384,641
MECHANICAL MOVEMENT AND SWAGING MACHINE
Filed Aug. 1, 1942   3 Sheets-Sheet 1

INVENTOR.
FREDRICH J. RODE
BY
ATTORNEYS

Sept. 11, 1945. F. J. RODE 2,384,641
MECHANICAL MOVEMENT AND SWAGING MACHINE
Filed Aug. 1, 1942 3 Sheets-Sheet 3

INVENTOR.
FREDRICH J. RODE
BY Fay, Macklin, Golrick
Williams, Chilton and Isler
ATTORNEYS.

Patented Sept. 11, 1945

2,384,641

UNITED STATES PATENT OFFICE 2,384,641

MECHANICAL MOVEMENT AND SWAGING MACHINE

Fredrich J. Rode, Toledo, Ohio, assignor to E. W. Bliss Company, Brooklyn, N. Y., a corporation of Delaware Application August 1, 1942, Serial No. 453,262

10 Claims. (Cl. 78—42)

This invention is concerned with mechanical movements which incorporate hydro-transmission of power and the general object thereof is the provision of a hydro-pneumatic mechanism particularly adaptable to the performance of work by the deliverance of powerful impacts in a rapid repititious manner.

A further object of the present invention is the provision of a swaging machine which incorporates a hammer mechanism that can be operated in a reciprocatory manner at high speed while delivering a powerful blow.

A further object of the invention is the provision of a swaging apparatus for reducing and shaping tubular work pieces whereby sections of the work piece can be reduced in diametrical dimension in a rapid manner without disrupting the metallurgical structure of the work piece.

Other uses and objects of the invention will become apparent from the following description referring to the accompanying drawings illustrating a preferred embodiment of the invention and the essential characteristics thereof are summarized in the claims.

In the drawings

Figure 1:
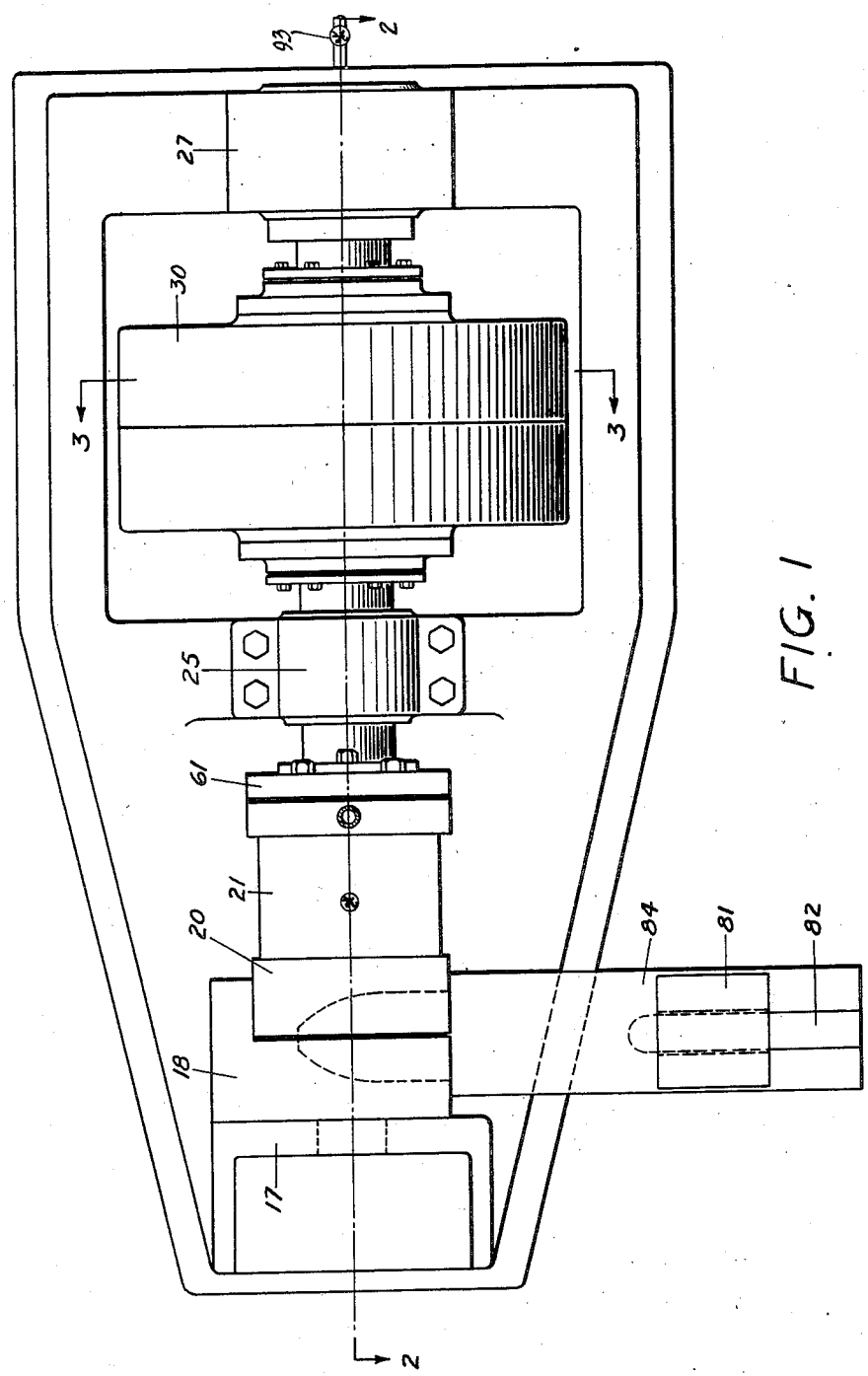
Fig. 1 is a plan view of a swaging machine incorporating the features of my invention and which is particularly adaptable to the formation of nose shapes upon tubular shell pieces.

The present invention contemplates the provision of a mechanically rotatable means associated with a stationary mounting comprising part of a hydraulic power transmitting means having associated therewith a reciprocatory head hydraulically driven in one direction to deliver a forging or shaping blow and in the opposite or return direction, by pneumatic pressure. The head carries a die member in cooperative relation to a stationary die member between which die members the work piece is shaped, formed or swaged by a series of blows.

In the particular embodiment of the invention shown in the drawings, the die members illustrated are of such shape as to form a nose on a tubular shell blank, there being a carriage for supporting the work relative to the die members and for revolving or turning the work as the same is fed between the die members.

Specifically the apparatus comprises a machine frame 10 in the form of a bed casting having bearing pedestals 11 and 12 which support a fixed hollow member 14, the latter also comprising a radial cylinder head or block as will be described. One end of the machine frame is provided with a horizontally disposed die rest or table portion 16 and a vertical thrust portion 17 comprising a support for a fixed die member 18. The rest portion 16 also comprises a horizontal slide and guide for the complementary movable die member 20. The movable die member 20 is fixed to a reciprocatory head 21, which is hydraulically impelled in a die closing direction and pneumatically retracted to separate the dies in a manner which will now be described.

As shown, the hollow member 14 is fixed to the frame by a key 24 set in the pedestal portion 11 and is held in position on the frame by a cap 25 which serves as a clamp disposed intermediate the machine frame immediately adjacent the head structure. The outer or opposite end of the member 14 is supported by a flanged thrust member 26, the latter being clamped in position on the machine frame pedestal 12 by a cap member 27.

Mounted upon the hollow member 14 and intermediate the bearing pedestals 11 and 12 is a rotary cam mechanism for imparting radial movement to a series of radially operable pistons which exert impulses on oil trapped within the hollow member 14. This impeller mechanism may comprise a hollow pulley structure in the form of a rotary casing driven by a belt indicated by the dotted lines in Fig. 2. The casing comprises right and left hand complementary members 30 and 31 which rotate as a unit on bearing mechanisms 32 and 33 supported by the fixed member 14. The casing members 30 and 31 are held in a keyed and clamped relation by bolts 35 whereby inner shoulders 36 and 37 thereof engage two annular cam rings or members 38 and 39 in clamped relation to thereby rotate as part of the casing. The cam members 38 and 39 have series of risers formed thereon which act upon rollers 29 directly supported upon the outer ends of piston members 40 and 41 respectively. The piston members are disposed in radial bores 42 and 43 formed in an enlargement 45 of the fixed hollow member 14 which will hereafter be termed the cylinder head.

Figure 3:
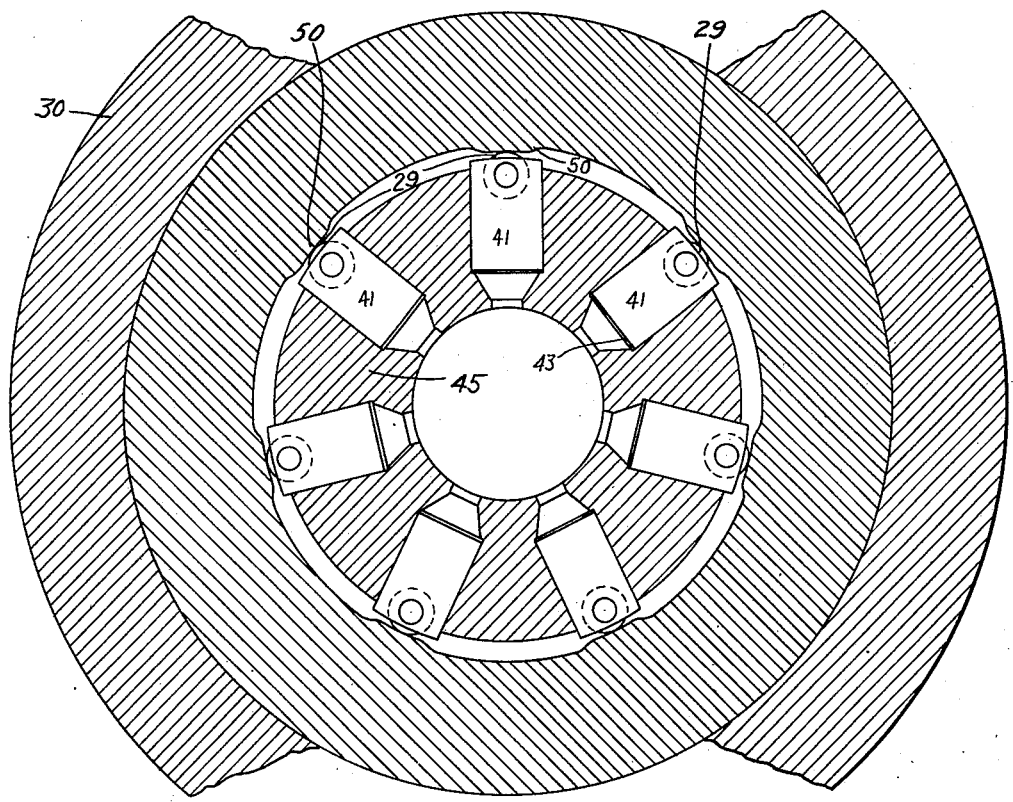
Fig. 3 is a cross sectional view of a rotary impeller means comprising a part of the apparatus embodying my invention and taken substantially along the lines 3—3 of Fig. 1.
Figures 4, 5:
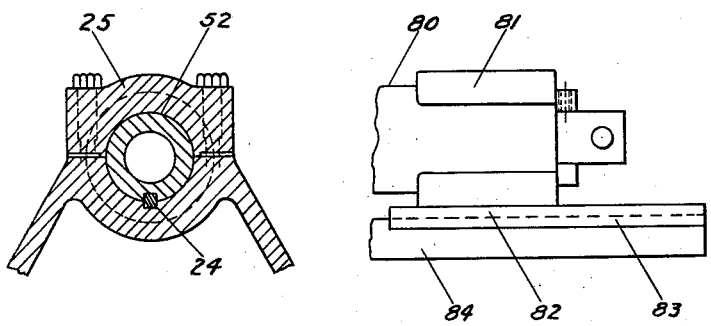
Fig. 4 is a cross sectional detail taken along the line 4—4 of Fig. 2.
Fig. 5 is a fragmentary view of a work carrying slide comprising part of the apparatus illustrated in the drawings.

As shown in Fig. 3, the cylinder head 45 is provided with seven pairs of cylinder bores radially spaced with the pistons 40, 41 disposed in the respective cylinder bores. The inner ends of the cylinder bores are tapered down to relatively small diameters in order that independent hydraulic communication may be established with the hollow interior of the fixed member 14 within the dimensions of a restricted circumference.

Figure 2:
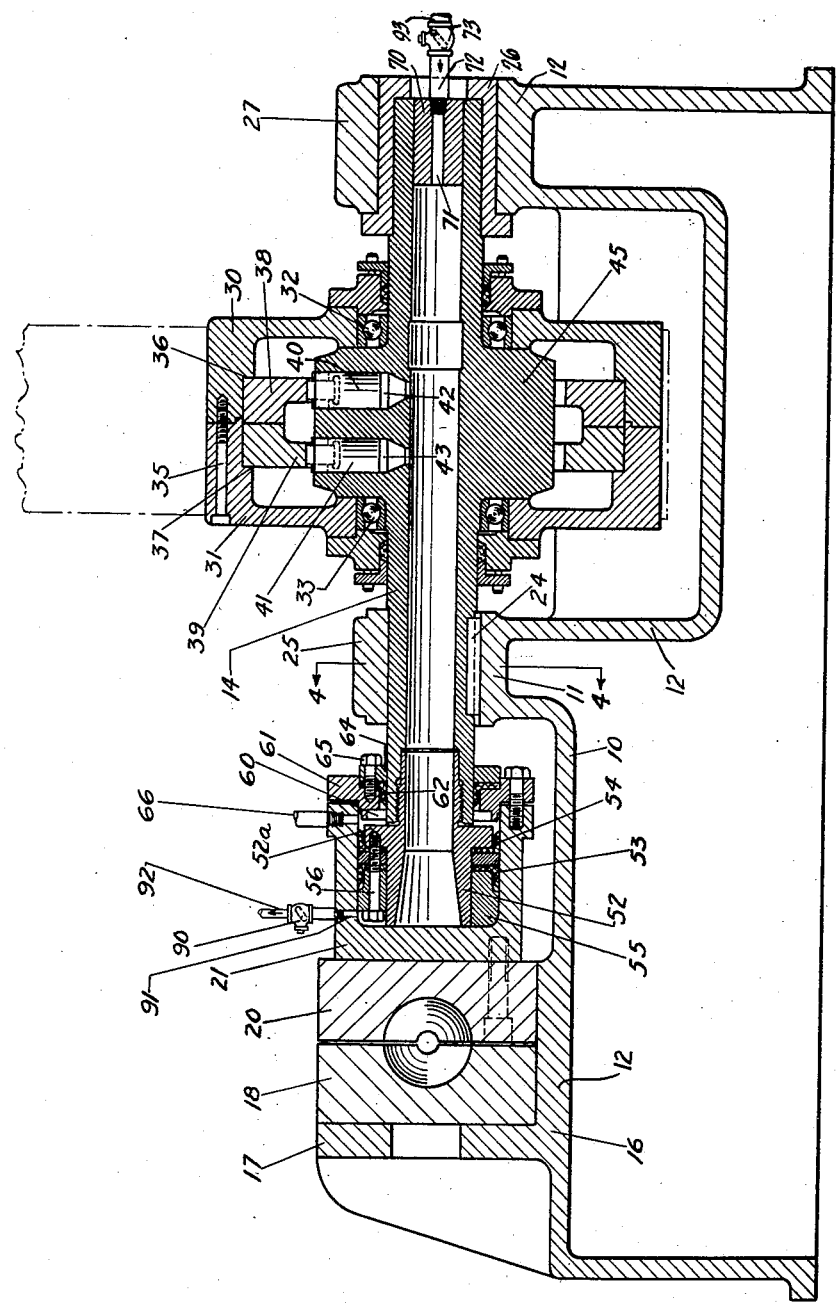
Fig. 2 is a cross sectional side elevation taken centrally through the machine substantially along the line 2—2 of Fig. 1.

As shown in Figs. 2 and 3 the in and out positions of the pairs of pistons 40, 41 are coincident and the risers 50 formed on the cam members 38 and 39 are in coincident radial relation so that as the cam members are rotated upon the fixed member 14 and about cylinder head 45 all of the pistons displace some of the oil within the confines of each of the cylinder bores, simultaneously.

The reciprocatory power delivering head 21 is mounted to slide upon an extension member 52 in threaded engagement with the end of member 14. The head has incorporated therein an oil sealing means and a pneumatic sealing means as will now be described. The hollow member 52 is of cylindrical formation to support skirted packing members 53 and 54 held in position by a clamping ring 55. The ring 55 is secured to an annular shoulder 52ᵃ formed on the member 52, by bolts 56, the packing members 53 and 54 being in slidable sealing relation to the internal bore of the head member 21. Thus when impulses or displacements of the oil within the fixed member 14 are effected by the radially inward movement of the piston members 40 and 41 the oil forces the head 21 and the movable die member 20 in a die closing direction, that is, to the left of Fig. 2 and this movement comprises the forging or swaging movement of the head 21.

The pneumatic arrangement for shifting the head is in an opposite direction i. e. from die closing position to open die position. The inner end of the head 21 comprises a pneumatic chamber 60 formed by a closure cap 61 and the flange 52ᵃ. This cap 61 has associated therewith a skirted pneumatic sealing gasket 62 held in sealed relation to the fixed member 14 by a clamping ring 64 and bolts 65. The gasket 54 completes the chamber seal. The pneumatic chamber 60 thus provided between the shoulder 52ᵃ of the head structure and gasket 62 is connected to an external source of pneumatic pressure by a line 66 and the pneumatic action thus available will be referred to hereafter.

It will be noted that the fixed member 14 has the outer end thereof closed by a plug member 70 provided with an oil passageway 71 which terminates in a pipe connection 72 and check valve 73.

The oil displacement of all of the pistons 40, 41 when acting in unison is greater than the volumetric increase in capacity of the interior of the stationary member 14 when the head mechanism 21 has been moved outwardly to die closing position. This over-displacement assures delivery of a full impact to the head 21. In order to prevent an oil lock effect taking place upon the impeller mechanism, due to this over-displacement, I have arranged a recirculating system for the surplus oil. A check valve mechanism 90 is connected into the interior of the head 21 through a passageway 91. The valve mechanism 90 is settable to permit the escape of oil from the head within the range of practical operating pressures of which the impeller mechanism is capable of impressing upon the confined oil. When the dies are closed the pressure builds up to open valve 90 and the over-displacement of oil escapes by way of an oil line 92.

Thus the valve mechanism is disposed in a return line 92 which connects to a pump (not shown) and the pump is connected to the check valve mechanism 73, by a line 93. The pump pressure is such as to be in excess of the minimum pressure which would prevail within the cylinder head 45 and stationary member 14, this minimum pressure prevailing at the time the compressed air in chamber 60 has caused the interior surface of the end wall of the head to abut the end of the member 55.

It is to be understood that the pneumatic pressure exerted within the air chamber 60 of the head mechanism will be such as to retract the movable part of the head mechanism and the die member carried thereby to the position shown in Fig. 2, during those momentary periods when piston rollers 29 are not being acted upon by the cam risers 50 and this pneumatic pressure serves to exert sufficient pressure upon the confined oil to force the pistons radially outwardly. Since there is an overdisplacement of the oil by the pistons, which passes or escapes through valve 90, there will be a deficiency of oil within the member 14 at the completion of the pneumatic retraction of the head. This oil deficiency is met by the action of the pump and inflow through check valve 73 at a sufficient pressure to complete the outward stroke of the pistons but not in excess of the pneumatic pressure in chamber 60.

It will be seen from the foregoing description of the head 21 and its impeller mechanism that the apparatus described is utilizable for a variety of purposes. However in the particular illustration of work to be done the die members 18 and 20 are shown as swaging dies for reducing an end of a tubular blank of a shell nose shape.

To support such a work blank while in a heated condition, I have provided a blank support comprising a spindle or arbor 80 of a diameter to loosely fit within the tubular blank. The member 80 is horizontally and revolvably supported by the head 81 of a work slide 82 operating in a slideway 83 formed in a frame member 84. The frame member 84 is suitably attached to the machine bed 10 in any convenient manner. The work holder arrangement described is such that the operator can feed and revolve a heated tubular work blank into the dies by manual operation of the slide head 81 and work arbor 80. Mechanical means for effecting such feeding will be obvious to those desiring the same.

It will be seen that the disclosed apparatus embodies a mechanical arrangement of a rotary cam mechanism which rotates about an extension of the line or path of movement of the head and designated in certain of the claims as the lineal direction of movement of the head.

To those skilled in the art, it will be apparent that the return or non-working stroke of the head can be effected other than by the use of pneumatic pressure, such for example as a constant pressure spring arranged to react between the head and member 14.

Also it is to be seen that the disclosed invention embodies a reciprocating tool head having a lineal movement imparted thereto by a hydraulic force generated by a multiplicity of concurrently acting fluid compressing and displacing means actuated in a working direction by a rotary element which rotated about the lineal direction of movement of the head to impart hydraulically transmitted impulses to the head and tool during each revolution thereof.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A swaging machine comprising a machine frame supporting a stationary die member, a movable die member carried by a reciprocable head in cooperating relation to the fixed die member, hollow means reciprocably supporting said head, a series of compression cylinders in communication with the interior of said hollow means, said hollow means comprising a hydraulic transmission to the head, pistons in the cylinders, rotary means supported by the hollow means for driving said pistons in a compression direction to thereby effect displacement of fluid from the cylinders into said hollow means, thence to the head to move the head in a die closing direction and means for moving the head in a die opening direction.

2. A swaging machine comprising a machine frame supporting a stationary die member, a movable die member carried by a reciprocable head in cooperating relation to the fixed die member, hollow means reciprocably supporting said head with an inner surface of the head exposed to the interior of said hollow supporting means, a series of compression cylinders in communication with the interior of said hollow means, pistons in the cylinders, rotary means supported by the hollow means for stroking said pistons in a compression direction to thereby effect displacement of fluid from the cylinders into said hollow means whereby the head is shifted in a die closing direction and pneumatic means for shifting the head in a die opening direction.

3. A swaging machine comprising a machine frame supporting a stationary die member to be operable in a substantially horizontal direction, a movable die member actuated by a reciprocable head in cooperating relation to the fixed die member, stationary hydraulic transmitting means reciprocably supporting said head, a series of compression cylinders in communication with the hydraulic transmitting means, pistons in the cylinders, rotary means for driving said pistons in a compression direction to thereby effect displacement of fluid from the cylinders to the transmitting means and against the head to drive the head in a die closing direction and means for shifting the head in a die opening direction.

4. A mechanism for effecting a reciprocating mechanical movement of a hammer head comprising a multiple fluid displacing means adapted to impart a lineal movement to the head in one direction by a hydraulic force generated by said multiple fluid displacing means said displacing means having an element rotatable about the lineal direction of movement of the head to thereby impart a multiplicity of hydraulically transmitted impulses to the head per each revolution of the rotary element and a substantially constant pressure means acting on the head for imparting a retractile movement to the head intermediate each hydraulic impulse transmitted to the head.

5. A mechanism for effecting a reciprocating mechanical movement of a tool head comprising a multiple fluid displacing means adapted to impart a lineal movement hydraulically to the head, said multiple fluid displacing means having an element rotatable about the lineal direction of movement of the head and a substantially constant pressure means acting on the head for imparting a retractile movement to the head.

6. A mechanism for effecting a reciprocating mechanical movement of a tool head comprising a multiple fluid displacing means adapted to impart a lineal movement to the head, said multiple fluid displacing means having an element rotatable about the lineal direction of movement of the head to thereby impart a multiplicity of hydraulically transmitted impulses by pressure rises and fluid displacements per each revolution of the rotary element and a substantially constant pressure operated means acting on the head for imparting a retractile movement to the head intermediate each hydraulically effected movement thereof.

7. A swaging machine having a reciprocating tool head adapted to be hydraulically driven in a work impact direction, a source of hydraulic pressure comprising a rotary means acting upon a series of pistons and the piston cylinders being directly connected to a hydraulic transmitting means for driving the head in a work performing direction, other means for shifting the head in a reverse direction and a hydraulic system connected to the head for receiving fluid displaced from the hydraulic transmitting means and for returning the fluid to the hydraulic transmitting means.

8. A swaging machine comprising a machine frame supporting a stationary die member, a movable die member carried by a reciprocable head in cooperating relation to the fixed die member, hollow means reciprocably supporting said head with an inner surface of the head exposed to the interor of said hollow supporting means, a series of compression cylinders in communication with the interior of said hollow means, pistons in the cylinders, rotary means supported by the hollow means for stroking said pistons in a compression direction to thereby effect displacement of fluid from the cylinders into said hollow means whereby the head is shifted in a die closing direction, a substantially constant pressure means for shifting the head in a die opening direction and a hydraulic recirculating system for receiving fluid intermittently forced out of the hollow means by said pistons under a relatively high pressure and for returning said displaced fluid to the pressure environment of said pistons at a lower pressure.

9. In a swaging machine the combination of a reciprocating hammer head adapted to be hydraulically driven in a work impact direction in a highly repetitious manner, rotary means intermittently acting upon a plurality of pistons whereby the pistons are caused to exert hydraulic pressure upon the head to drive the head in a work performing direction and pneumatically actuated means for shifting the head in a reverse direction following each work performing impact of the head.

10. In a swaging machine the combination of a reciprocating hammer head adapted to be driven in a work impact direction in a highly repetitious manner, a rotary means acting upon a plurality of pistons exerting hydraulic pressure and effecting fluid displacement to thereby drive the head in a work performing direction, means forming a fluid transmitting chamber interconnecting the pistons and head, pneumatically actuated means for shifting the head in a reverse direction and a hydraulic system connected to the head for receiving fluid forced out of the head by the pistons and for returning the displaced fluid to said chamber.

FREDRICH J. RODE.